(12) United States Patent
Lewis et al.

(10) Patent No.: US 9,098,369 B1
(45) Date of Patent: Aug. 4, 2015

(54) APPLICATION INSTALLATION USING IN-VIDEO PROGRAMMING

(71) Applicant: Google Inc., Mountain View, CA (US)

(72) Inventors: Justin Lewis, Marina Del Rey, CA (US); Gavin James, Los Angeles, CA (US)

(73) Assignee: GOOGLE INC., Mountain View, CA (US)

( * ) Notice: Subject to any disclaimer, the term of this patent is extended or adjusted under 35 U.S.C. 154(b) by 71 days.

(21) Appl. No.: 14/079,201

(22) Filed: Nov. 13, 2013

(51) Int. Cl.
  *G06F 9/44* (2006.01)
  *G06F 9/445* (2006.01)
(52) U.S. Cl.
  CPC ........................................ *G06F 8/61* (2013.01)
(58) Field of Classification Search
  None
  See application file for complete search history.

(56) References Cited

U.S. PATENT DOCUMENTS

| | | | |
|---|---|---|---|
| 2009/0119169 A1* | 5/2009 | Chandratillake et al. | 705/14 |
| 2010/0223113 A1* | 9/2010 | Lee | 705/14.4 |
| 2014/0282724 A1* | 9/2014 | Chalozin et al. | 725/35 |
| 2014/0365604 A1* | 12/2014 | Lewis et al. | 709/217 |

OTHER PUBLICATIONS

Ryan Lawler, Youtube Launches InVideo Programming to Boost Video and Channel Promotion, Oct. 2012 (http://techcrunch.com/2012/10/25/youtube-invideo-programming/).*

* cited by examiner

*Primary Examiner* — Don Wong
*Assistant Examiner* — Deric Ortiz
(74) *Attorney, Agent, or Firm* — Lowenstein Sandler LLP

(57) ABSTRACT

A method for delivering and installing applications on media devices includes receiving a video file includes a video at a processor remote from the media devices; associating, at the processor, an in-video programming element with the video; receiving application access data for a mobile application; associating the application access data with the in-video programming element; receiving a request for displaying the on a first media device; providing the video and the in-video programming element to the first media device; receiving a signal to install the mobile application; and executing a mobile media device application installation process to install the mobile application.

27 Claims, 6 Drawing Sheets

APPLICATION INSTALLATION USING IN-VIDEO PROGRAMMING

BACKGROUND

Video delivery services allow individuals, companies, and organizations to provide videos for distribution over a video delivery system. Viewers may access the videos for viewing. Some video providers may produce an application that may be installed to a media device on which the videos are displayed. The application installation process may involve a viewer accessing an online store, searching for the application, and then executing an application upload process.

SUMMARY

A method for delivering and installing applications on media devices includes receiving a video file including a video at a processor remote from the media devices; associating, at the processor, an in-video programming element with the video; receiving application access data for a mobile application; associating the application access data with the in-video programming element; receiving a request for displaying the video on a first media device; providing the video and the in-video programming element to the first media device; receiving a signal to install the mobile application; and executing a mobile media device application installation process to install the mobile application.

A method for installing applications on media devices includes providing a video in a video player of a first media device, providing a video annotation, comprising an identification of an application, for display at a scheduled time during the display of the video; determining an application state of the application in the first media device; receiving the application identification at a server remote from the first media device; receiving a signal to install the application at the first media device; and remotely installing the application in the first media device.

A system for remotely installing applications on media devices includes a processor; and a computer readable storage medium having instructions for remotely installing an application on a media device. The processor executes the instructions to receive a request from the media device to remotely install the application, determine an application state of the application in the media device, determine compatibility of the application and the media device, provide an in-video programming element to the media device, the element comprising a link to the application, receive a selection of the link from the media device, and provide the application to the media device for remote installation.

A system for remotely installing applications on media devices includes a processor and a computer readable storage medium having instructions for remotely installing an application on a media device. The processor executes the instructions to provide an in-video programming element in a video file to the media device, the element including an access to the application; receive a request from the media device to remotely install the application, determine an application state of the application in the media device, and determine compatibility of the application and the media device.

A method for installing applications on media devices includes using a processor, receiving and displaying a video on a first media device; displaying an in-video element related to an application during the display of the video; sending a remote application installation request; receiving a remote application installation instruction; and receiving and installing the application on the first media display device.

DESCRIPTION OF THE DRAWINGS

The detailed description refers to the following figures in which like numerals refer to like items, and in which.

DETAILED DESCRIPTION

Figure 1:
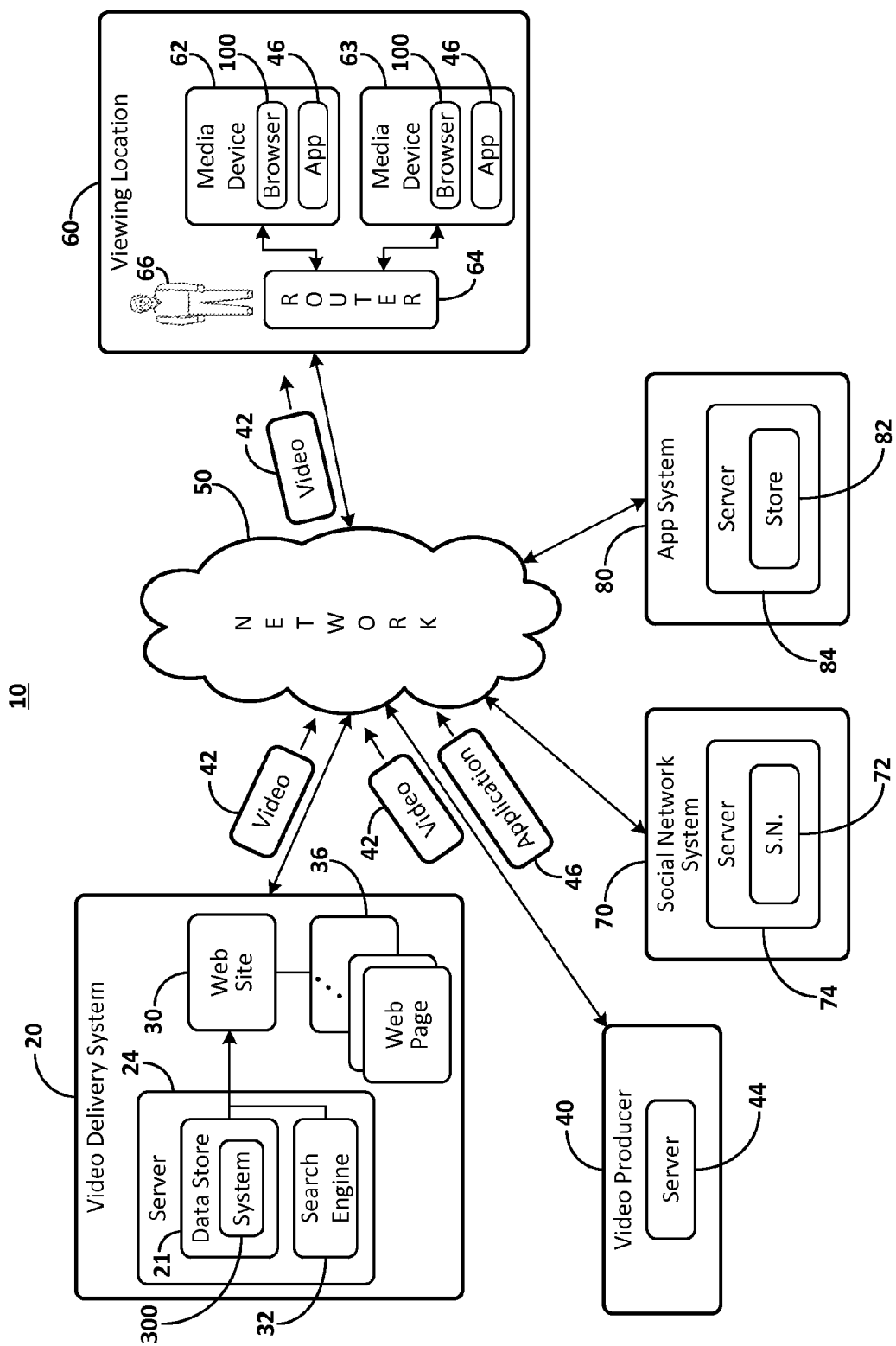
FIG. 1 illustrates an example environment that supports application installation from in-video programming.

A video delivery system may offer free video distribution services to individuals and entities that create, produce, or provide videos (generally referred to hereafter as video creators) and that upload videos (video uploaders) to the video delivery system. Note that video creators need not be video uploaders. The video delivery system may generate revenue through sales of advertisements that accompany display of the videos. Video creators range from individuals, to small companies, to large corporations. Video creators also may generate applications that may be installed on media devices, and particularly on mobile media devices that display the videos to viewers (generally referred to hereafter as Web site visitors). The video creators may use application installation as a revenue generating endeavor; that is, video creators may provide videos without charge, but may attempt to monetize their efforts through the sale of applications for installation on the mobile media devices. For example, a Web site visitor may pay $2.99 to install an application on a mobile media device. Video creators that are able to monetize their application development efforts may produce higher quality videos, which ultimately may benefit operators of the video delivery system through increased traffic and corresponding increased advertising revenue.

Video creators face many challenges trying to sell or otherwise disseminate their applications. First, it often is difficult to demonstrate the compelling features of an application with a simple link or a static Web page. A video may be a better platform for promoting applications because a video may allow potential application users to see how the application actually functions. Unfortunately, even if application developers create videos or video creators develop applications, the videos and applications may not be referenced together on a video Web page in a manner that makes for a streamlined application installation process. For example, a video and an application installation feature may appear on the same video Web page, but without any clear linkage between the video and the application and no clear path for installing the application.

Furthermore, many applications are only available at and may be purchased from an online application store. Online application store purchases may require Web site visitors to navigate away from a current Web page, access the online store, search for a specific application (there are millions), and possibly find the desired application. In some instances, a Web site visitor watching a video on a video watch page may desire to install an application referenced in the video being viewed. The Web site visitor thus must navigate away from the video watch page, find the online application store, search for, and with luck find, the desired application.

Still further, current mechanisms do not provide for application installation across multiple media devices using a single installation process. For example, a Web site visitor may have both a tablet and a smart phone. In an embodiment, the tablet and smart phone may be related to each other such as by notation in a remote data base. Note that this relationship between devices does not require a direct, wired or wireless, link between the devices. If the Web site visitor is browsing content on the smart phone while away from the tablet, the Web site visitor may see an application he wants to install on the tablet; however, the Web site visitor may lose track of the application by the time the Web site visitor returns to using the tablet.

To improve the application installation process and to better promote and publicize mobile applications, disclosed herein are systems and methods for delivery and installation of applications from within a video. The systems and methods apply to both the client side (i.e., a Web site visitor's media devices) and the server side (i.e., a video delivery system). The systems include in-video programming, video annotation, and remote installation features.

In an embodiment, a video uploader (who may, but need not be the video's creator) may access a video manager program to upload a video to a video delivery server. The video uploader then may use an in-video module to add an application to the video. Using the in-video module, the video uploader may specify one or more in-video application programming options. For example, the video uploader may specify a start and stop time during the video to display a video annotation. The video annotation, in an embodiment, may include an application installation link. Alternately, the video annotation may include an application identification token or other application access data to identify and access the application. In an aspect, the video uploader may enter a unique identification for the application. This identification may be keyed to a channel identification for the video uploader, or to a unique identification of the video being annotated. The unique identification further is keyed to applications maintained in an online application store. Finally, media devices having the applications installed may be registered with the online application store, and a current state of applications installed on the registered media devices may be maintained at the online application store. The in-video module provides remote application installation functionality to a Web site visitor's media device. As a result the video acts as a host for application installation.

In an aspect, the herein disclosed in-video programming and video annotations are visual elements that appear at select times during the display of a video. The visual elements may appear in the corners of the video, for example, and may link to a video channel, a subscribe button for the video channel, or a next video for the Web site visitor to view, for example. The visual elements further may link to a remote install program and to an online application store.

In an embodiment, when a video is rendered in a video player (for example, on either a Web site visitor's mobile media devices or other Web page clients) in-video application scheduling data established by the video creator may be passed to the video player. At the appropriate time designated in the scheduling data, the video player displays a video annotation to the Web site visitor and requests the designated in-video application programming. The request causes a remote server (e.g., the video delivery server) to retrieve in-video application programming options selected by the video creator. The request further may cause the remote server to fetch the installation state of the application (based, for example, on the application's unique identification) for the media device executing the video player. The remote server also may fetch the installation state of the all of Web site visitor's media devices. For example, the Web site visitor may register a smart phone and a tablet with the video delivery system, which may in turn maintain an application installed registry for each of the smart phone and the tablet. Alternately, the remote server may query the smart phone and tablet to obtain this information. In an aspect, when a media device already has the application installed, the remote server may not, in response to the request, return the in-video programming. In another aspect, when a media device has the application installed, the remote server may return the in-video programming, and when the Web site visitor clicks on the displayed video annotation, the application may open. In yet another aspect, when the referenced application is not installed on the media device, the returned video scheduling response will contain the in video programming for the remote application installation.

In an embodiment, when the Web site visitor clicks on the video annotation for the application, the in-video programming may cause the remote server to either install the application on one or more of the Web site visitor's media devices, provide a prompt to the Web site visitor asking the Web site visitor to designate media devices to receive the application, open the application if already installed on the media device, and access and open the online application store.

In addition to not returning the in-video programming when an application already is installed on the media device, in an embodiment, the in-video programming may not be returned under other circumstances including, for example, the application is not compatible with the media device's operating system, the Web site visitor has disabled video annotations, the Web site visitor has dismissed in-video programming for the application multiple times, and the video has too many other in-video programming options.

In another embodiment, the in-video programming always is returned, but when the linked application already is installed, the in-video programming prompts the Web site visitor to designate other media devices to receive the application. In an aspect, the in-video programming provides a selectable list of the Web site visitor's media devices and with a simple click, the Web site visitor can initiate remote installation of the application.

In an embodiment, the remote application installation may be affected through an advertisement such as a pre-roll video advertisement. The pre-roll advertisement may include a video annotation displaying a remote installation element with a link to an application.

FIG. 1 illustrates an example environment that supports application installation from in-video programming. In FIG. 1, environment 10 includes video delivery system 20, video producer 40, communications network 50, video viewing location 60, social network system 70, and application service 80. In an embodiment, certain of the entities shown in FIG. 1 may be combined; for example, the video delivery system 20 may operate the application service 80.

The video delivery system 20 operates Web site 30. The Web site 30 is hosted on Web server 24. The Web site 30 includes Web pages 36. The Web site 30 may include Internet search features such as search engine 32 that allow Web site visitors 66 to search for videos and other content displayed by the Web server 24 on the Web pages 36. The Web pages 36 may display videos, as well as video advertisements, static advertisements, and other content and information. The Web server 24 may provide links to enable navigation among the Web pages 36.

The Web pages 36 may display search results in response to a search query submitted by Web site visitor 66 using the search engine 32. For example, a Web page 36 may display several videos that satisfy a search query. Each such video may be assigned a unique identification (ID).

The Web site 30 may display videos created and uploaded by Web site visitor 66, video producer 40, and other entities.

The Web server 24 may incorporate components of a video advertisement system (not shown) that serves, or facilitates service of, advertisements on the Web pages 36.

Finally, Web server 24 may host remote application installation system 400, which may provide for certain video annotation features described herein.

The video delivery system 20 may allow Web site visitors 66 to subscribe to a video service of the video delivery system 20. In an aspect, a subscription may provide Web site visitors 66 with greater access to features of the video delivery system 20. When subscribing, a Web site visitor 66 may be asked to provide certain personal information, such as age and gender, for example. The Web site visitor 66 also may be able to link to social networks, such as the social network 72 to which the Web site visitor 66 also may be subscribed, and to the video delivery system 20.

The video producer 40 provides content, in the form of videos 42 that may be displayed on the Web pages 36, and viewed and/or heard by the Web site visitor 66 using the media devices 62 and 63. The video producer 40 may be a company, a movie or television studio, or an individual, including Web site visitor 66.

The video producer 40 also may produce applications 46. The applications may be installed on media devices 62 and 63. In an aspect, Web site visitors 66 may access and purchase the applications from an online store such as application store 82. One mechanism for such purchases is by separately accessing the online store and searching its contents for a specific application or type of application. However, this mechanism may be burdensome to the Web site visitor 66. For example, the Web site visitor 66 may be watching a video on a video watch page, and thus would have to navigate away from the video watch page to install the application.

The communications network 50 may be any network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the video delivery system 20 and a media device at the viewing location 60 across a wire line or a wireless link. While illustrated as a single or continuous network, the network 50 may be divided logically into various sub-nets or virtual networks, so long as at least a portion of the network 50 may facilitate communications among the entities of FIG. 1.

The viewing location 60 may be the residence of an individual, such as Web site visitor 66, who operates media devices 62 and 63 to access, through router 64, resources such as the Web site 30. The viewing location 60 may be a mobile location that changes with time as, for example, when the Web site visitor 66 changes his location. The media devices 62 and 63 may be fixed or mobile. For example, media device 62 may be an Internet connected smart television (iTV) (e.g., a television incorporating a processor and a browser); a basic or smart television connected to a set top box (STB) or other Internet-enabled device; a Blu-ray™ player; a game box; and a radio, for example. Media device 63 may be a tablet, a smart phone, a lap top computer, or a desk top computer, for example. The media devices 62 and 63 may include browsers, such as browser 100. The browser 100 may be a software application for retrieving, presenting, and traversing resources such as at the Web site 30. A resource may be identified by a Uniform Resource Locator (URL) and may be a Web page, image, video, or other content. The URL may allow the browser 100 to connect to the Web site 30. Hyperlinks present in resources enable the Web site visitor 66 to navigate the browser 100 to related resources. The Web site visitor 66 may operate the browser 100 to search for Web sites related to specific topics or to search for a specific Web site by URL. The media devices 62 and 63 also may include applications 46.

The Web site visitor 66 may cause the media devices 62 or 63 to execute an application 46, such as a mobile banking application, to access online banking services. The application 46 may involve use of a browser or other means, including cellular means, to connect to the online banking services. Other applications may include game applications. The game applications may include provisions for serving video advertisements during the play of the game. As described herein, the Web site visitor 66 may access, purchase, and install the application 46 using in-video programming in addition to other installation mechanisms.

Once connected to the Web site 30, the media devices 62 and 63 may allow viewing of content such as videos and static images generated by entities such as the video producer 40 and displayed on the Web pages 36 at the Web site 30. The videos and static images may include slots or spaces into which programs such as advertisements may be placed. When such a video or static image is to be viewed on the media devices 62 or 63, the browser 100 may send an advertisement request to an ad server (not shown) which may be answered with a video advertisement and/or a static advertisement.

In some situations, information related to the Web site visitor 66, including identities of the media devices 62 and 63, geographical locations of the media devices 62 and 63, and other data, may be collected by the video delivery system 20 and other entities shown in FIG. 1.

In situations in which the systems disclosed herein collect personal information about a Web site visitor 66, or may make use of personal information, the Web site visitor 66 may be provided with an opportunity to control whether programs or features collect Web site visitor traffic (e.g., information about the Web site's social network, social actions or activities, profession, an viewing preferences, or current location), or to control whether and/or how to receive content that may be more relevant to or of more interest to the Web site visitor 66. In addition, certain data may be treated in one or more ways before it is stored or used, so that personally identifiable information is removed. For example, a Web site visitor's identity may be treated so that no personally identifiable information can be determined for the Web site visitor 66, or a Web site visitor's geographic location may be generalized where location information is obtained (such as to a city, ZIP code, or state level), so that a particular location of the Web site visitor 66 cannot be determined. Thus, the Web site visitor 66 may have control over what information is collected about the Web site visitor 66, how that information is collected, and how the collected information is used.

Social network system 70 operates server 74 to provide social network 72. The social network 72 may allow subscribers, such as Web site visitor 66, to interact with other subscribers, may provide comments, upload and share videos, and upload and share images.

The Web site visitor 66 may be a subscriber to the social network 72. To be a subscriber, the Web site visitor 66 may register with the social network 72, and provide certain specific information, such as age and gender.

The Web site visitor 66 may use the social network 72 to communicate with designated friends or contacts. The Web site visitor 66 may use the social network to make recommendations to these friends or contacts. In an aspect, the Web site visitor 66 may make recommendations (i.e., share a video) with friends or contacts, or more generally, with other subscribers to the social network.

In an aspect, when the Web site visitor 66 shares a video annotated with in-video programming for application installation, the in-video programming also is shared. In this aspect, therefore, a video that goes viral may lead to widespread promotion and dissemination of the linked application since the application remains linked to the video regardless of the number of time the video is shared and viewed.

The application service 80 includes online application store 82. The application store 82 may operate as a repository for online applications (e.g., applications 46). Application developers may upload applications 46 to the application store. Applications 46 may have a unique identification. Applications 46 may be linked to videos 42 created by video producer 40.

Figure 2:
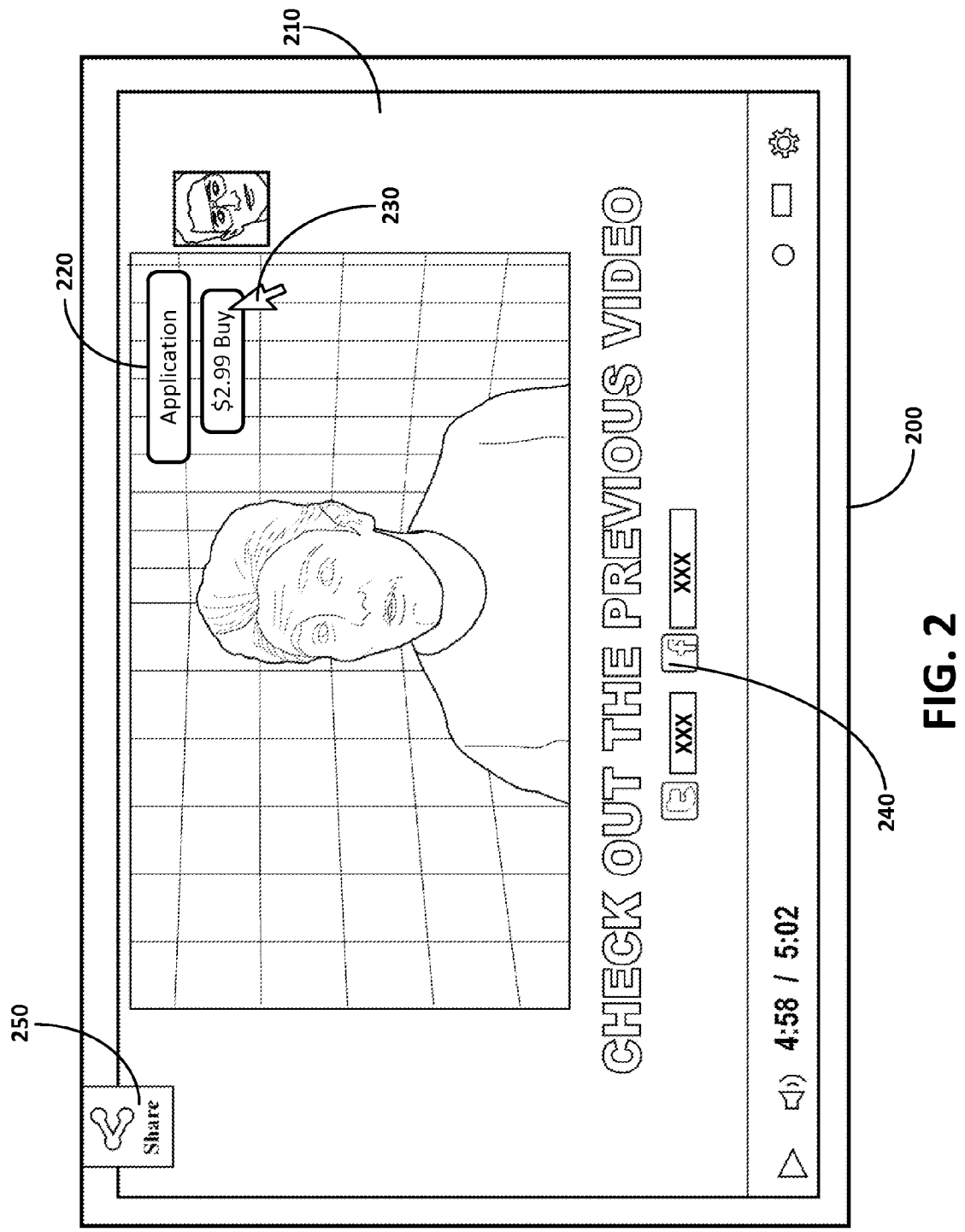
FIG. 2 illustrates an example video watch page that provides for application installation from in-video programming.

FIG. 2 illustrates an example video watch page implementing video annotations for remote installation of applications using in-video programming. A frame of an example video is shown displayed on the video watch page. The example video may be a series of funny clips with corresponding commentary by a host. The example video may be provided by the video producer 40 or another video creator, including the Web site visitor 66. The video creator may upload the video to video server 24 for display by video delivery system 20.

In FIG. 2, video watch page 200 (only a portion of which is illustrated) includes video player 210 in which a requested/selected video is displayed. Overlaying a portion of the video player 210 is video annotation application button 220 and sharing button 250.

In an embodiment, the application button 220 is displayed at a start time designated by the video creator. The video creator also may designate a location on the video player 210 where the application button 220 may appear. The application button 220 may be displayed as a background image until the Web site visitor 66 places cursor 230 over the application button 220.

The video creator also may designate a fade time or length of time for the application button 220 to appear in the video player 210. In addition, the video creator may designate an end time for display of the application button 220. The video creator may designate other appearance-related requirements for the application button 220, such as color, size, icon image, and other features.

The application button 220 may state a cost (if there is one) to install the application, and a link to the online application store 82. In an aspect, when the Web site visitor 66 clicks on the application button 220, browser 100 in the Web site visitor's media device may send an initial request to the remote server 84. The request may initiate a series of exchanges between the browser 100 and the server 84.

Alternately, when the video annotation is displayed in the video player 210, a remote server may push the application to the media device. However, if the application already is installed on the media device, or is not compatible with the media device, the remote server may not push the application to the media device.

The video player 210 may display social network links 240 for the video creator/application developer. The video player 210 also may display the sharing button 250 by which the Web site visitor 66 shares the video with other potential viewers such as friends or contacts in social network 72.

Figure 3:
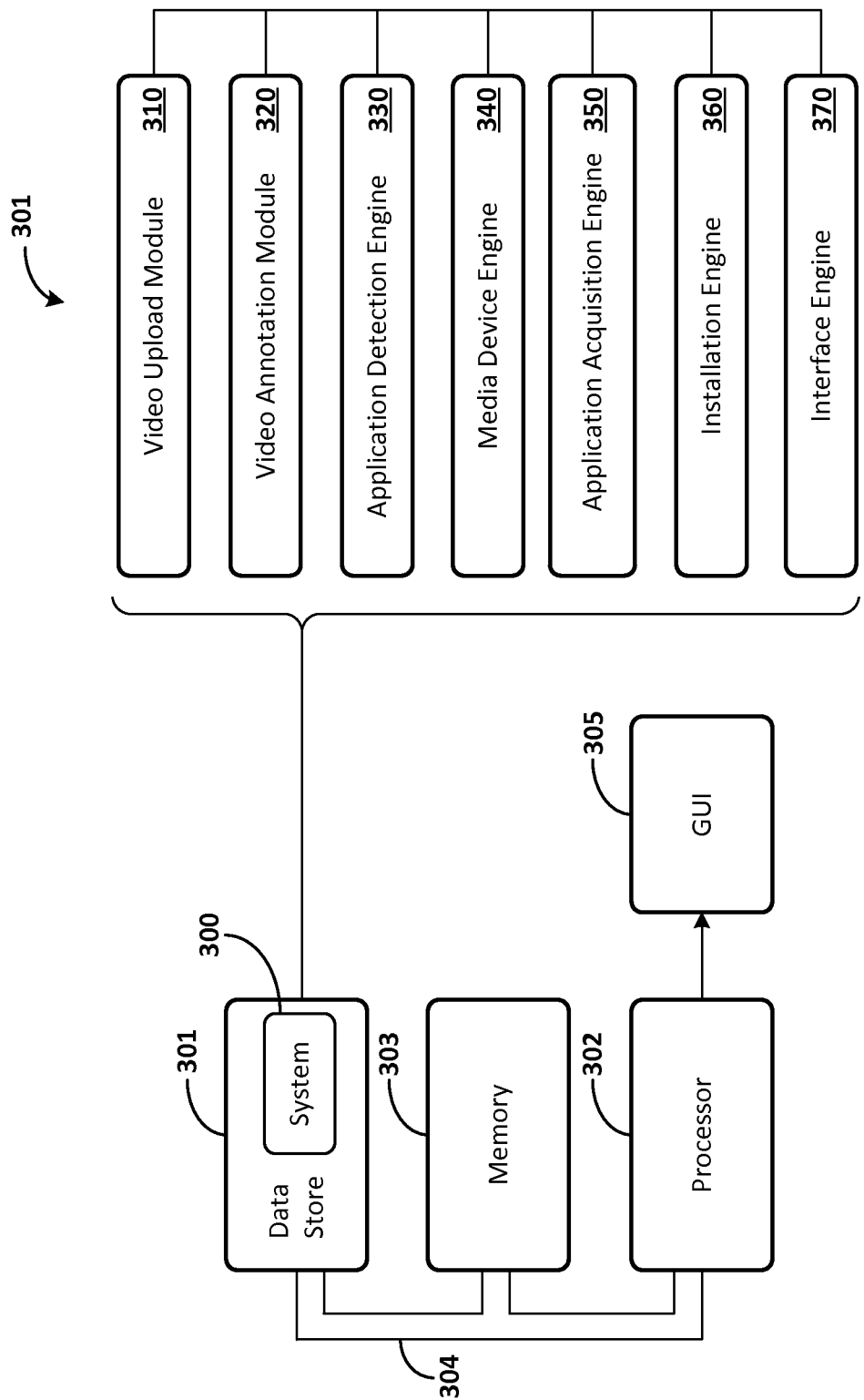
FIG. 3 illustrates an example system that supports application installation from in-video programming.

FIG. 3 illustrates an example system that supports application installation from in-video programming. In FIG. 3, system 300 includes video upload module 310, video annotation module 320, application detection engine 330, media device engine 340, application acquisition engine 350, application installation engine 360, and interface engine 370.

The system 300 may be implemented in part on server 24 and/or server 84. The system 300 may be stored in non-transitory computer readable storage medium 301, accessed by processor 302, loaded into memory 303 over bus 304, and executed by the processor 302. The system 300 may generate graphical user interface (GUI) 305 through which various functions of the system 300 are made available to the video creator or video uploader. For example, the GUI 305 may provide a display of the video in a particular format, may provide a pull down list of commands and features (e.g., upload, annotate, attach application, specify application features) from which the video creator may select, and other features, windows, controls, and displays. Alternately, the functions of GUI 305 may be incorporated into one or more buttons, menus, and windows displayed on the video watch page 200 (see FIG. 2).

Video upload module 310 allows the video creator to upload a video to the Web site 30.

Video annotation module 320 allows the video creator to add one or more video annotations to the uploaded video. One such video annotation is an interactive application that provides a link to an application installation system, module, or engine at an application store such as the online application store 82. As an alternative to a link, the video creator may add an application identifier and location of the application to the video annotation. The video annotation module 320 also may provide a menu of application options, such as price to charge, appearance of the annotation, animation features that may accompany the video annotation, and other features.

Application detection engine 330 detects an installation state of an application at a specific media device. For example, a first media device may have a mobile banking application installed, but a second mobile device may not. Both the first and second media devices are registered to the same Web site visitor 66 and the application installation may be stored as data in the system 300 or other system external to the media devices. Alternately or in addition, the state of application installation at the media devices may be discovered by the application detection engine 330 at the time of an application installation request sent from the media device over the network 50.

Media device engine 340 determines a media device type (e.g., smart phone, tablet; device model, processor) and an operating system of the requesting and/or registered media devices. In an aspect, the operating system and other information may be determined by exchange of data with the media devices.

Application acquisition engine 350 acquires an identity of application version that is appropriate for the determined operating system of a media device. For example, an application developer may produce different applications for different operating systems and for different media device types (smart phones, tablets).

Application installation engine 360 provides in-video programming for remote installation of an application on the requesting/registered media devices. In an embodiment, the Web site visitor 66 designates specific media devices to receive the application installation. The application installation engine 360 may execute a remote installation for all powered-on and network-connected media devices designated by the Web site visitor 66. If a designated media device is not powered-on, or is not network-connected, the engine 360 may execute a remote installation the next time the media device connects to the network 50.

Interface engine 370 drives GUI 305, and allows the video creator to interact with the system 300 to upload and annotate videos with applications.

Figure 4:
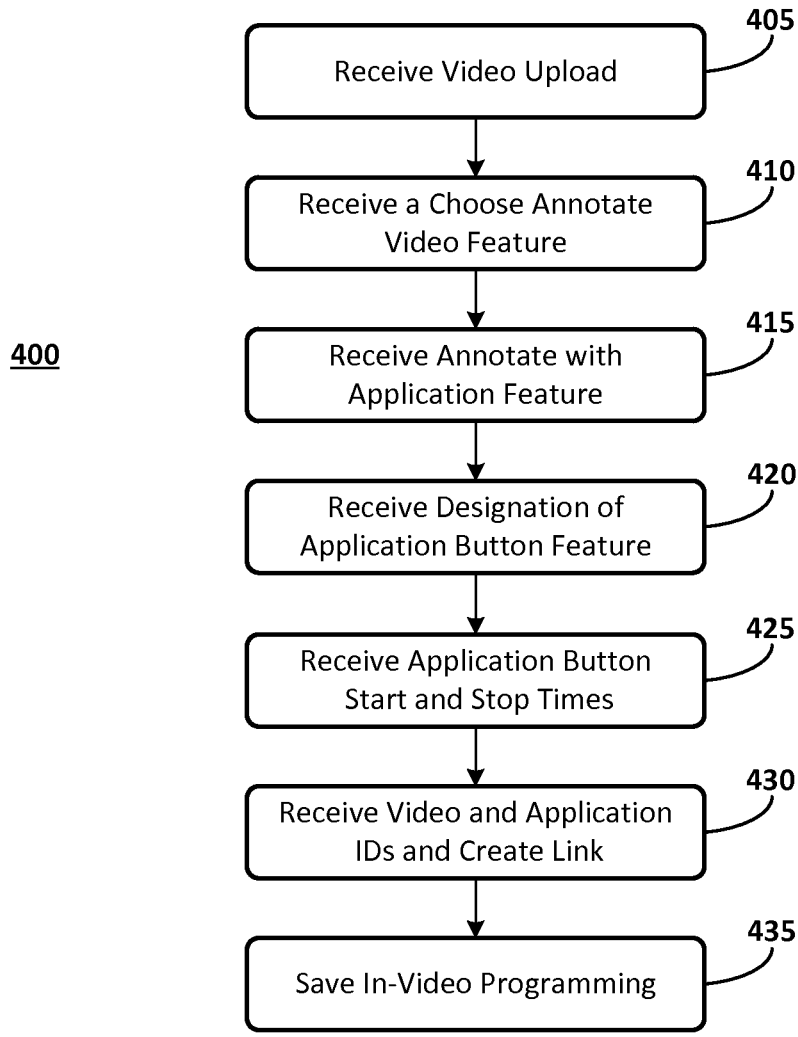
FIGS. 4-5B are flow charts illustrating example methods for application installation from in-video programming.
Figure 5A:
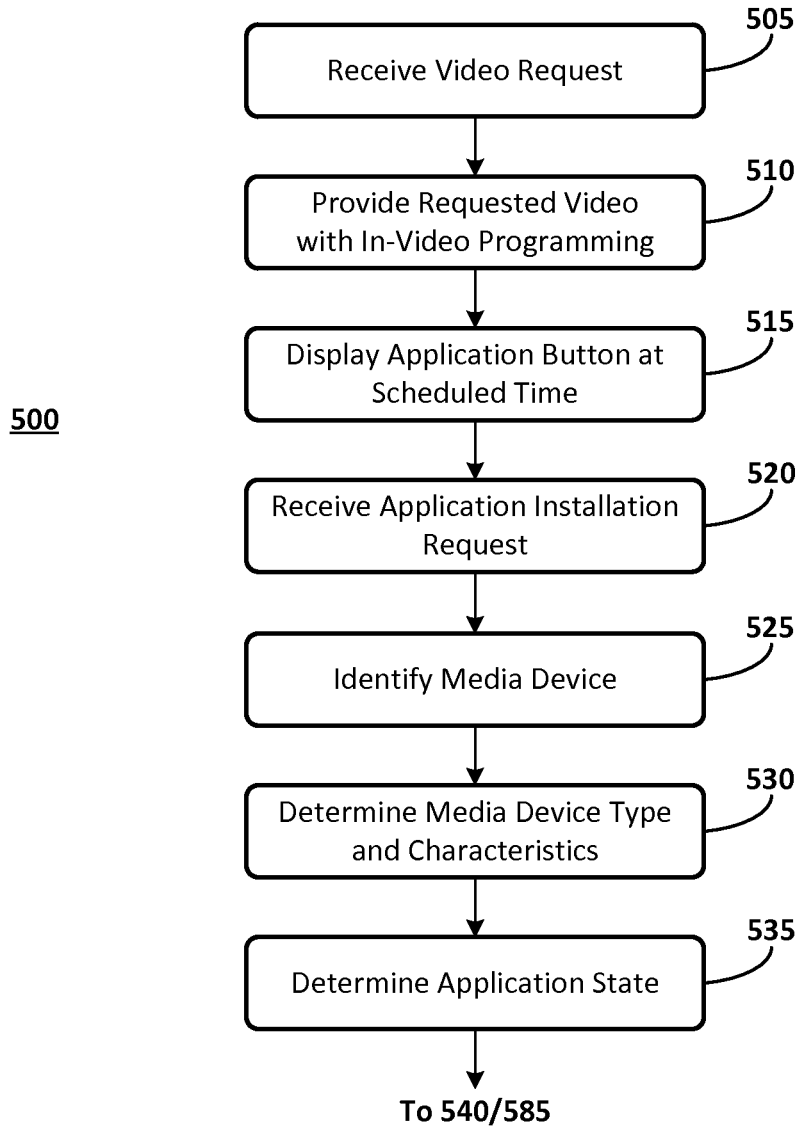
Figure 5B:
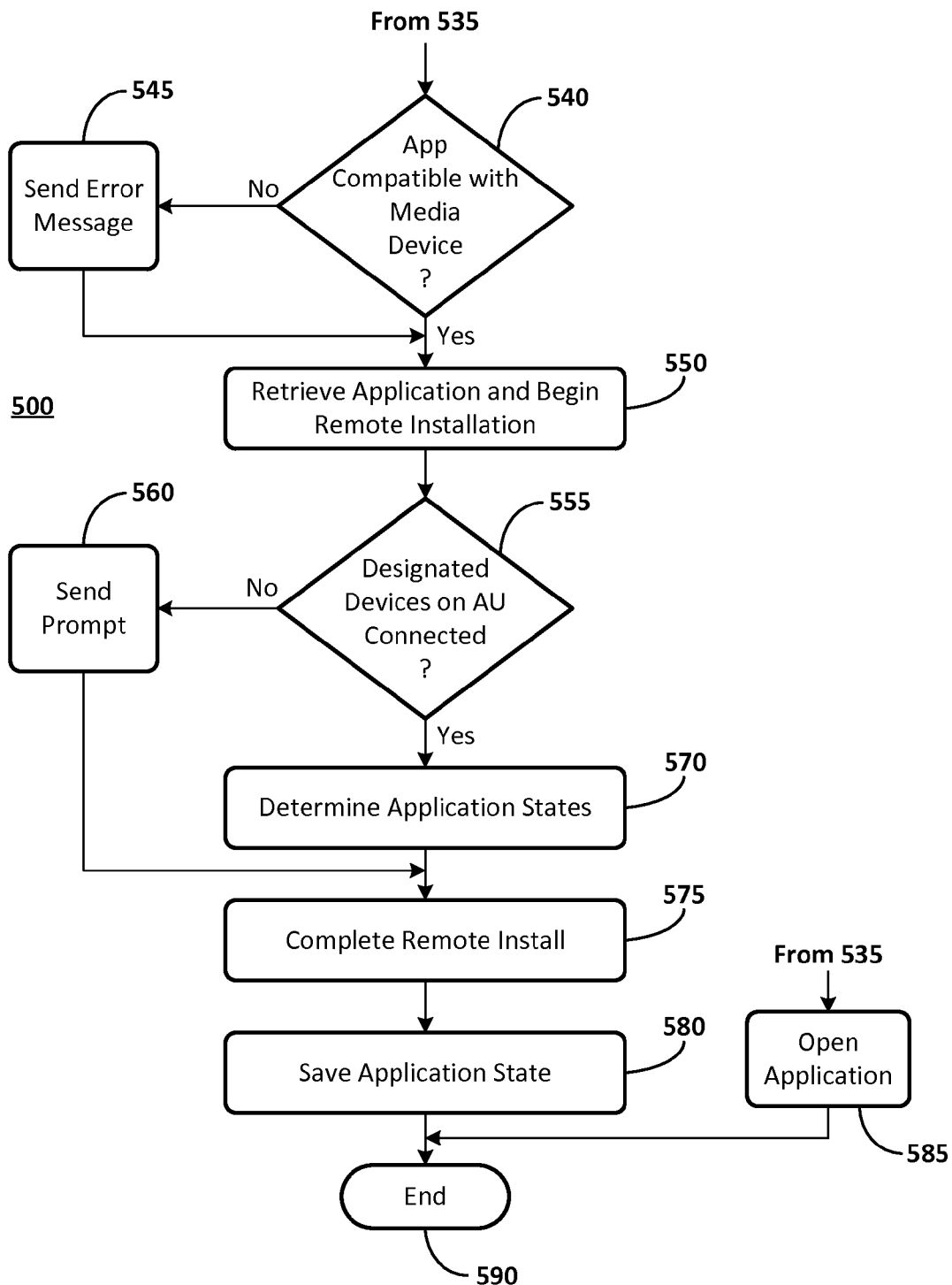

FIGS. 4-5B illustrate example methods for video annotation and remote application installation using in-video programming. The methods of FIGS. 4 and 5A and 5B5 are is described with respect to the environment, systems, and devices of FIGS. 1-3.

In FIG. 4, method 400 begins in block 405 when a video creator uploads a video to Web site 30. In block 410, the video creator chooses an annotate video feature from a list of available commands. The commands may be provided, for example, in a pull-down list displayed as a part of graphical user interface (GUI) 305 generated by the system 300.

In block 415, the video creator further chooses an annotate video with application installation programming feature. Other features that the video creator may choose are:
  including a prompt to suggest to the Web site visitor be presented with a prompt to designate media devices on which the application may be installed;
  opening the application if already installed on the media device(s);
  accessing and opening an online application store; and
  providing an overlay with accompanying voice audio suggesting the Web site visitor 66 click on the application button 220.

In block 420, the video creator designates the aspects of the in-video programming features to be displayed with the video 300. In block 425, the video creator chooses a start time for application button 220 to appear in the video. The start time may be at the start of video. The video creator may elect to annotate the video with multiple applications. When the video is displayed to the Web site visitor 66, application button(s) 220 will begin display at the time(s) selected by the video creator. The video creator also may chose a fade time or and end of application button display at which point, an application button 220 no longer will be displayed.

In block 430, the video creator provides unique identifications of the video and the application, and the system 300 associates (e.g., creates a link between) the video and the application. In block 435, the system 300 saves the features of the video annotation in a persistent data store, along with the unique identification of the video and the unique identification of the application, and with the association between the video and the application. Note that the application itself may be stored in a data store separate and apart from the video annotation. In block 440, the method 400 ends.

FIGS. 5A and 5B illustrate an example method for remote installation of an application using in-video programming. Method 500 begins in block 505 when Web server 24 receives a request for a video to be displayed on a media device of Web site visitor 66. In block 510, the Web server 24 provides the requested video, which includes one or more in-video annotations, and more specifically an application button 220. The Web server 24 also provides video player 210 if not already installed on the Web site visitor's media device.

In block 515, the start time of the in-video programming is reached, and the application button 220 is displayed on the video player 210 as an overlay to the video. In an embodiment, the system 300 receives a notification that the application button 220 is displayed.

In block 520, the system 300 receives a remote application installation request from the media device. The request may be initiated by the Web site visitor 66 clicking on the application button 220. Alternately, the system 300 may push the application data to the media device.

Prior to, or at this point, in an embodiment, the system 300, in block 525, determines the unique identification of the media device displaying the video. One mechanism for determining the media device identification is through log on to the Web server 24 by the Web site visitor 66. Another mechanism is a query sent to the browser 100 of the media device. The media device identification may be keyed to the Web site visitor 66 and to other media devices operated by the Web site visitor 66.

In block 530, the system 300 determines a type of media device (smart phone, tablet) and an operating system of the media device. In block 535, the system 300 determines an application state of the requesting media device. If the application already is installed, the method 500 moves to block 585. Otherwise, the method 500 moves to block 540.

In block 540, the system 300 determines if the requested application is compatible with the media device. Note that the video creator may have designated several different versions of the requested application, and the link from the video to the application may include a link to all application versions. If the requested application is not compatible, the method moves to block 545 and the system 300 sends an error message for display on the video player 210. Following block 545, the method 500 moves to block 550.

In block 540, if one of the application versions is compatible, the system 300 retrieves the application and initiates a remote installation process to install the application on the media device that originated the application request. As part of the remote installation, the system 300, in block 550, may prompt the Web site visitor 66 to select media devices on which the application is to be installed. Note that a version of the application to be installed on a smart phone may differ from an application version that is appropriate for a tablet but is not appropriate for a smart phone (e.g., the limited viewing area of the smart phone may be addressed by using an application that makes efficient use of the smart phone's limited viewing area). As an alternate to prompting the Web site visitor, the system 300 may use default rules to always install a version of the application on each of the Web site visitor's media devices.

When the Web site visitor 66 designates media devices to receive the application, the system 300, in block 555, determines if the designated media devices are powered on and connected to the network 50. If no designated media devices are powered-on and network-connected, the method 500 moves to block 560 and the system 300 sends a prompt suggesting the designated media devices be powered on and connected to the network 50. The method 500 then moves to block 575. In block 550, if the system 300 determines that one or more designated media devices is powered-on and network-connected, the method 500 moves to block 570

In block 570, the system 300 determines an application state for each of the designated media devices, as well as makes and models of the designated media devices and their operating systems.

In block 575, the system 300 continues with and completes the remote installation on the media device requesting the remote application installation (if compatible). In addition, the system 300 initiates and completes remote application installation on the designated media devices not already having the application installed.

In block 580, the system 300 saves a new application installation state for each of the media devices.

In block 585, since the system 300, in block 535, determined that the application already is installed on the requesting media device, components of the system 300, which may be installed on the media device with the video player 210, cause the application to open on the requesting media device.

Following either block 580 or 585, the method 500 moves to block 590 and ends.

Certain of the devices shown in FIGS. 1 and 3 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flow charts and accompanying description to illustrate the embodiments represented in FIGS. 4-5B. The disclosed devices, components, and systems contemplate using or implementing any suitable technique for performing the steps illustrated. Thus, FIGS. 4-5B are for illustration purposes only and the described or similar steps may be performed at any appropriate time, including concurrently, individually, or in combination. In addition, steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

We claim:

1. A method for delivering and installing applications on media devices, comprising:
   receiving a video file comprising a video at a processor remote from the media devices;
   associating, at the processor, an in-video programming element with the video;
   receiving application access data for a mobile application;
   associating the application access data with the in-video programming element;
   receiving a request for displaying the video on a first media device;
   providing the video and the in-video programming element to the first media device;
   receiving a signal to install the mobile application; and
   executing a mobile media device application installation process to install the mobile application.

2. The method of claim 1, wherein the mobile media device application installation process is executed on the first media device.

3. The method of claim 1, wherein the mobile media device application installation process is executed on a second media device.

4. The method of claim 1, wherein the in-video programming element, comprises:
   an application information device; and a selectable application acquisition feature, wherein selection of the feature:
   executes an acquisition transaction, and
   initiates the mobile media device application installation process.

5. The method of claim 1, wherein the mobile media device application installation process executes in a background of the first media device.

6. The method of claim 1, further comprising determining an application state of the mobile application on the first media device.

7. The method of claim 6, wherein the application state is installed, the method further comprising opening the application on the first media device.

8. The method of claim 6, wherein the application state is not installed, the method further comprising:
   determining compatibility of the mobile application and the first media device; and
   displaying the application link when the mobile application and the first media device are compatible.

9. The method of claim 1, wherein the mobile media device application installation process executes on a second media device related to the first media device.

10. The method of claim 9, further comprising:
   on the first media device, displaying a list of second media devices related to the first media device;
   receiving from the first media device, a selection of one or more second media devices; and
   determining compatibility of the mobile application and the selected one or more second media devices.

11. A method for installing applications on media devices, comprising:
   providing a video in a video player of a first media device,
   providing a video annotation, comprising an identification of an application, for display at a scheduled time during the display of the video;
   determining an application state of the application in the first media device;
   receiving the application identification at a server remote from the first media device;
   receiving a signal to install the application at the first media device; and
   remotely installing the application in the first media device.

12. The method of claim 11, wherein the first media device is related to one or more second media devices, the method further comprising:
   sending from the remote server, a prompt to install the application at one or more of the second media devices; and
   receiving a signal at the remote server to install the application at the one or more second media devices.

13. The method of claim 12, further comprising determining an application state of the application of each of the one or more second media devices.

14. The method of claim 11, wherein the video is shared at media devices of one or more contacts, the method further comprising:
   providing the video annotation with a display of the shared video.

15. A system for remotely installing applications on media devices, comprising:
   a processor; and
   a computer readable storage medium having instructions for remotely installing an application on a media device, wherein the processor executes the instructions to:
      provide an in-video programming element in a video file to the media device, the element including an access to the application;
      receive a request from the media device to remotely install the application,
      determine an application state of the application in the media device, and
      determine compatibility of the application and the media device.

16. The system of claim 15, wherein the application state is not installed, and wherein the processor provides the application to the media device for remote installation.

17. The system of claim 15, wherein the application state is installed, and wherein the processor does not provide the application to the media device.

18. The system of claim 15, wherein the processor queries the media device to determine the state of the application.

19. The system of claim 15, wherein the processor:
   identifies one or more additional media devices related to the media device; and
   sends a prompt to install the application on each of the additional media devices.

20. The system of claim 15, wherein the processor:
   receives videos from video uploaders;
   receives applications from the video uploaders;
   associates a video and an application based on unique identifications of the video and of the application; and
   receives a link to the application; and
   provides the link in the in-video programming element.

21. A method for installing applications on media devices, comprising:
   using a processor, receiving and displaying a video on a first media device;
   displaying an in-video element related to an application during the display of the video;
   sending a remote application installation request;
   receiving a remote application installation instruction; and
   receiving and installing the application on the first media display device.

22. The method of claim 21, further comprising:
   receiving application programming scheduling with receipt of the video; and
   displaying the in-video element during the display of the video at a time designated in the scheduling.

23. The method of claim 21, further comprising installing the application on second media devices related to the first media device.

24. The method of claim 23, further comprising providing an application state of the application on the first media device and on the second media devices related to the first media device.

25. The method of claim 23, further comprising:
   displaying on the first media device, a list of the second media devices;
   receiving by the processor an instruction to install the application on one or more of the second media devices; and
   sending by the processor a remote application installation request for installation of the application on the one or more second media devices.

26. The method of claim 21, further comprising receiving an instruction to request remote installation of the application prior to sending the remote application installation request.

27. The method of claim 21, wherein the in-video programming element, comprises:
   an application information device; and a selectable application acquisition feature, wherein selection of the feature:
   executes an application acquisition transaction, and
   sends the remote application installation request.

\* \* \* \* \*